J. O. ROSSER.
ARTIFICIAL EYE.
APPLICATION FILED AUG. 29, 1917.

1,253,888.

Patented Jan. 15, 1918.

John O. Rosser
Inventor

By Geo. P. Kimmel
Attorney

UNITED STATES PATENT OFFICE.

JOHN O. ROSSER, OF MILL HALL, PENNSYLVANIA.

ARTIFICIAL EYE.

1,253,888.  Specification of Letters Patent.  Patented Jan. 15, 1918.

Application filed August 29, 1917. Serial No. 188,783.

*To all whom it may concern:*

Be it known that I, JOHN O. ROSSER, a citizen of the United States, residing at Mill Hall, in the county of Clinton and State of Pennsylvania, have invented certain new and useful Improvements in Artificial Eyes, of which the following is a specification.

This invention relates to new and useful improvements in artificial eyes, and more particularly to the manufacture of a new and improved type of artificial eye formed of hardened white rubber comprising the main body portion, and having a glass iris therein which will form a very efficient article of manufacture of this character, that will not become roughened or chipped by constant use, and which will be found very efficient in operation.

Another object of the invention is to provide an artificial eye of this character, formed of any desired shape, preferably in the shape of a hollow shell, which is formed of hardened white rubber, having a glass iris embedded therein on its outer surface, said eye being adapted to be placed in the socket, and owing to the material from which it is formed, not being subject to be roughened by the acid of the eye, an objection, to which the conventional type of various eyes are open to.

A further object of the invention is to provide a device of this character which is easily and simply constructed, inexpensive to manufacture, and one which will be very efficient in operation.

With these and numerous other objects in view, my invention consists of the novel features of construction, combination, and arrangement of parts which will be herein referred to and more particularly pointed out in the specification and claims.

In the accompanying drawings:—

In describing my invention I shall refer to the drawings in which similar reference characters designate corresponding parts throughout the several views.

Figure 1:
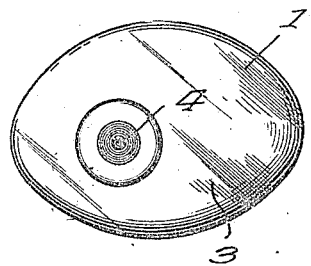
Figure 1 is a front view of one of the artificial eyes.
Figure 2:
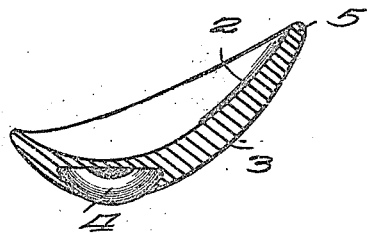
Fig. 2 is a section through the same.

The numeral 1 designates the main body portion of my new and improved artificial eye, which is molded in any desired shape, preferably in the form of a hollow shell, that is substantially concave-convex, as shown at 2, the outer surface 3 thereof, having embedded therein a glass iris 4.

The main body portion of the eye 1, is formed of hardened white rubber, and is shaped by any desired means, and which has its edge 5 rounded the purpose of which is obvious. By forming the body portion of hardened rubber, the same is not likely to roughen, or the edge chip, as is common to the conventional type of glass eyes used for artificial purposes, now in use.

The hardened white rubber body portion, is not subject to any action, from the acid in the eye, when the same is in use, and will not roughen or chip upon contact therewith. In the conventional type of glass eyes, the acid of the eye, soon roughens the edges thereof, and causes the same to chip, thereby rendering them unavailable for further use. This type of eye, is adapted for continuous use, and is very strong and durable when in operation. The artificial eye may be very economically manufactured and the same may be colored to simulate the human eye as is obvious.

From the above description taken in connection with the accompanying drawing, it is thought that a clear and comprehensive understanding of the construction, operation, and advantages of my invention may be had, and while I have shown and described the device as embodying a specific structure, I desire that it be understood that such changes may be made in said structure as do not depart from the spirit and scope of the invention as claimed.

Having fully described my invention, what I claim as new, and desire to secure by Letters Patent, is:—

1. An artificial eye including a main body portion formed of hardened white rubber.

2. An artificial eye including a main body portion formed of hardened white rubber, and a glass iris embedded therein.

In testimony whereof, I affix my signature hereto.

JOHN O. ROSSER.